United States Patent Office 3,211,699
Patented Oct. 12, 1965

3,211,699
POLYMERIC CHELATES OF BIS(2-CYANO-ARYLOXY) METALS
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,674
19 Claims. (Cl. 260—47)

The present invention relates to organometallic polymers and more particularly provides new and valuable polymeric chelates of certain bis(2-cyanoaryloxy)metal-(II) compounds and certain hydrocarbon nitriles.

An object of the invention is to prepare highly heat-resistant polymeric organometallic compounds. Another object of the invention is the provision of moldable compositions having very good thermal stability. Still another object of the invention is the provision of hard, compression-molded compositions having a high degree of resistance to extreme conditions of temperature and pressure. A further object of the invention is the provision of methods for the preparation of compositions which can be cast, molded or extruded to give solvent-resistant, thermally stable products.

These and other objects hereinafter disclosed are provided by the invention wherein there are prepared organometallic polymers by reacting together, at a temperature of from 125° C. to 500° C. and a pressure of from 3,500 kg./cm.² to 40,000 kg./cm.², (I) a hydrocarbon nitrile selected from the class consisting of the nitriles of α,β-mono-olefinic aliphatic hydrocarbon carboxylic acids having a total of from 3 to 6 carbon atoms, the dinitriles of paraffinic hydrocarbon dicarboxylic acids having a total of from 4 to 8 carbon atoms, and the dinitriles of benzenedicarboxylic acids and alkylbenzene dicarboxylic acids having a total of from 6 to 11 carbon atoms, and (II) a metal compound of the formula

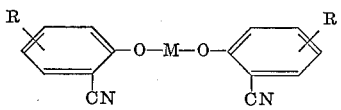

in which M is a metal selected from the class consisting of zinc, beryllium and cadmium and R is selected from the class consisting of hydrogen and alkyl radicals of from 1 to 5 carbon atoms.

Hydrocarbon nitriles suitable for the present purpose are the α,β-mono-olefinic aliphatic nitriles such as acrylonitrile, methacrylonitrile, α,α-dimethylacrylonitrile, crotononitrile, 2-pentenenitrile, maleonitrile, fumaronitrile, citracononitrile and dimethylfumaronitrile; the paraffinic dinitriles such as succinonitrile, adiponitrile, glutaronitrile, α-methyladiponitrile, β,β-dimethyladiponitrile and suberonitrile; and the aromatic and alkylaromatic dinitriles such as phthalonitrile, terephthalonitrile, isophthalonitrile, 4-methylterephthalonitrile, 5-isopropylisophthalonitrile, 3-ethylphthalonitrile, 5-pentylterephthalonitrile, etc.

The presently useful metal compounds are bis(2-cyanophenoxy)zinc, bis(2-cyanophenoxy)cadmium, or bis(2-cyanophenoxy)beryllium, or such compounds having alkyl substitution at the benzene ring, e.g., bis(2-cyano-3-methylphenoxy)zinc, bis(2-cyano-4-isopropylphenoxy)beryllium, bis(2-cyano-4-butylphenoxy)cadmium, bis(2-cyano-5-pentylphenoxy)zinc, etc. They are prepared by the reaction of salicylonitrile or an alkyl-substituted salicylonitrile with a dialkylmetal(II) compound, as described in our copending application Serial No. 123,662 filed of even date, and issued as Patent Number 3,057,895. Thus, by reaction of salicylonitrile with diethylzinc, preferably in the presence of an inert organic diluent such as benzene and at ordinary room temperature there is obtained bis(2-cyanophenoxy)-zinc, substantially according to the scheme:

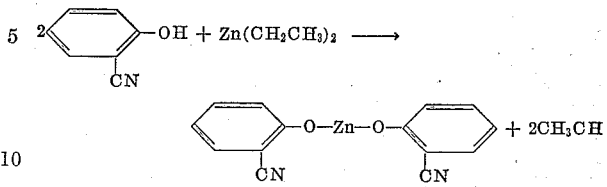

Instead of reacting the performed bis(cyanoaryloxy)-metal compound with the α,β-olefinic nitrile, or the alkane or arene dinitrile, the presently provided polymeric chelates are also obtained by reacting the hydrocarbon nitrile with a mixture consisting essentially of salicylonitrile and the metal oxide. Under the high temperature, high pressure conditions which are employed, i.e., temperatures of at least 125° C. and pressures of at least 3,500 kg./cm.², the metal oxide condenses with salicylonitrile or a 2-hydroxy(alkphenyl)nitrile, e.g., cresotonitrile, to give the bis(2-cyanophenoxy)metal(II). This then reacts with the hydrocarbon nitrile or dinitrile to give the polymeric chelate.

The presently provided chelates are hard, cross-linked, highly insoluble, difficulty fusible polymers. Infrared spectra show the essential disappearance of the —CN groups and the appearance of bonds characteristic of the triazine structure. Elemental analysis shows retention of the metal and of the oxygen content of the starting materials. The presently provided polymeric materials are thus believed to be metal chelates containing a plurality of triazine structures and containing the metal in tetracoordinate form with two valence bonds thereof probably being satisfied by linkage to oxygen and the two covalent bonds probably being satisfied by linkage to a nitrogen atom of the triazine nucleus. Although it is known that salicylonitrile and its alkyl derivatives are converted by heat to trimers which have a triazine structure, salicylonitrile for example being trimerized to 2,4,6-tris(2-hydroxyphenyl)-s-triazine, the substantial absence of —CN groups in the polymer indicates conversion also of the hydrocarbon nitrile component into a triazine structure. Coordinate bonding of the metal to the nitrogen of the triazine structure results in the polymeric chelate.

The presently provided organometallic polymers are advantageously prepared by simply mixing the hydrocarbon nitrile with the bis(2-cyanoaryloxy)metal(II) or with the metal oxide and the 2-hydroxyarylnitrile and subjecting the mixture to heat and pressure. Preparation of the polymer is, therefore, conveniently conducted in the mold. Thus the intimate mixture, advantageously containing the reactants in a ratio which may vary from 1:1 or 5:1 of bis(2-cyanoaryloxy)metal to hydrocarbon nitrile, is charged to the mold, and the mixture is condensed to the polymeric, molded object under high pressure (5,000–14,000 atmospheres) and at a temperature of, say, 125 to 500° C., and generally at 150° to 300° C. The presently provided polymeric chelates can thus be prepared in the mold to give hard molded objects of well-defined dimensions; or, if desired, the mixture of finely comminuted reactants, i.e., the hydrocarbon nitrile and the bis(2-cyanoaryloxy)metal(II) or the metal oxide and 2-hydroxyarylnitrile from which the latter arises, can be impregnated into a porous, heat-resistant structure, and the impregnated structure submitted to heat and pressure for effecting polymerization of the mixture within the interstices of the structure. Likewise, for laminating use, the mixture of reactants can be polymerized between the laminates.

The presently provided polymeric chelates are characterized by a high degree of stability to heat and solvents, which stability may be ascribed not only to the presence of the metal, but also to the triazine structure and to coordinate bonding of the metal. They are, therefore, of particular utility in the fabrication of hard, molded pieces destined to be used under conditions involving exposure to extreme heat and/or attack by solvents. The molded polymers have high breaking strengths, and very good values are obtained in tests for deflection before rupture. Many of the polymers which are prepared either in the presence or absence of solvents are stable at temperatures which are well over 900° F. Accordingly, compression molding of the polymers presents a problem in that the standard molding equipment cannot generally be used. The presently provided, extremely heat-resistant polymeric chelates can be molded by compression between electrically heated, hardened steel anvils at pressures of from, say, 3725 kg./cm.$^2$ to 30,000 kg./cm.$^2$. The necessity of using especially devised, high pressure molding apparatus is compensated for, of course, by the very unusual thermal properies of the molded pieces. The polymeric chelates can also be extruded through slits or nozzles under high temperature and pressure conditions, or they may be cast or extruded from solvents such as N,N-dimethylformamide or the dialkyl sulfoxides to give, e.g., tapes, fibers, or dimensioned cast objects.

Advantageous utilization of the present polymers is in fields wherein they can be prepared in situ, i.e., in molding, bonding, laminating or impregnating applications whereby the mixture of reactants is placed in the mold or applied to filler or backing and reaction between the hydrocarbon nitrile and the bis(2-cyanoaryloxy)metal is subsequently completed by use of heat and pressure.

Plasticized organometallic polymers can be prepared by intimately mixing the hydrocarbon nitrile and the bis(2-cyanoaryloxy)metal (or metal oxide and hydroxy nitrile) with adjuvants which may be ethers or esters that are in themselves highly resistant to heat, and submitting the resulting mixture to heat and pressure for the polymerization reaction to occur. Examples of such adjuvants are polyphenyl ethers having from 4 to 5 benzene rings, esters of aromatic polycarboxylic acid, aryl ethers of hydroxyarylnitriles such as 2-phenoxybenzonitrile, etc. Valuable molded objects are also obtained by heating under pressure the mixture of reactants together with heat-resistance fillers, e.g., asbestos fiber, silica, etc.

The invention is further illustrated by, but not limited to, the following examples.

*Example 1*

Bis(2-cyanophenoxy)zinc(II) was prepared as follows: A mixture consisting of 4.8 g. of salicylonitrile and 60 ml. of benzene was warmed to solution under nitrogen, and there was added therto, dropwise, 12 ml. of a 25% solution of diethyl zinc in benzene, while maintaining the reaction mixture in a nitrogen atmosphere. Ethane was evolved at a rapid rate as the diethyl zinc was added, and was carried off. The white solid which was immediately precipitated in the reaction mixture was rapidly filtered, with exclusion of moisture, washed with benzene and dried to give the substantially pure bis(2-cyanophenoxy)zinc(II), analyzing 19.93% Zn as against 21.68% the calculated value for $C_{14}H_8N_2O_2Zn$.

The above prepared compound was reacted with terephthalonitrile to a molded polymeric chelate in a Bridgman apparatus built for use at high temperature. The anvils of the apparatus were made of high speed steel, 3″ in diameter and 3″ long, tapered at one end at an angle of 65° to the central axis. The cones were truncated to give flat surfaces ⅜″ in diameter. The anvils were equipped with heaters capable of raising the temperature to 450° C., and they were supported in a hydraulic press on water-cooled bases and were insulated from the bases by thick mica sheets. The maximum pressure attainable between the anvil faces was 37,500 kg./cm.$^2$.

An iron or brass ring having an internal diameter of ⅜″ was placed on lower anvil to serve as a mold. A finely powdered mixture consisting of 1.2 g. of the bis(2-cyanophenoxy)zinc(II) and 0.25 g. of terephthalonitrile was placed in the ring and compression molded at 350° C. and 17,500 kg./cm.$^2$ for 55 minutes to give a brown, hard, coherent disc having a uniform thickness of 2 mm. Infra-red analysis of the product showed that formation of triazine structure had occurred and the virtual absence of —CN bonds.

*Example 2*

A mixture consisting of 0.6 g. of salicylonitrile and 5 g. of adiponitrile was ground to a fine powder and 0.2 g. of the mixture was subjected to compression, using the apparatus described in Example 1, at a maximum temperature of 200° C. and 7,650 kg./cm.$^2$ for about 30 minutes. A soft brown semi-solid product was thus obtained.

In another experiment 0.9 g. of the above-prepared mixture of salicylonitrile and adiponitrile was intimately mixed with 0.2 g. of zinc oxide and the whole was subjected to compression in the same apparatus using substantially the conditions which had been employed above for the zinc oxide-free mixture. There was thus obtained a very hard, orange disc of very good mechanical strength.

The above two experiments indicate that the difference in the products is due to polymerization by coordination with the metal ion in the case of the second experiment.

*Example 3*

A mixture consisting of 0.6 g. of the bis(2-cyanophenoxy)zinc(II) of Example 1 and 0.2 g. of acrylonitrile was intimately ground together in a mortar and condensed while being compression molded in the high pressure apparatus described in Example 1 at a pressure of 7,650 kg./cm.$^2$ and a maximum temperature of 199.5–201° C. for 15 minutes. An orange-brown molded disc of the polymer was thus obtained.

In another run, 0.55 g. of the 3:1 by weight mixture of bis(2-cyanophenoxy)zinc(II) and acrylonitrile was ground with 0.2 g. of 2-phenoxybenzonitrile, and the resulting mixture was condensed and compression molded in the high pressure apparatus at 202° C. and 7,650 kg./cm.$^2$. There was thus obtained a coherent, brown molded disc, 0.77 mm. thick and 9.55 mm. in diameter.

*Example 4*

Zinc oxide (0.2 g.) was finely ground with 0.7 g. of a 2:1 mixture of salicylonitrile and acrylonitrile, and the resulting powdered material was condensed and compression molded in the apparatus described in Example 1 at 180° C. and 5100 kg./cm.$^2$ for 50 minutes. There was thus obtained a smooth, shiny, hard, molded disc, 0.82 mm. thick. Testing of the molded piece for mechanical strength, employing the Instron Tensile Tester, showed that it supported 168 g. with a deflection of 0.2 mm. before rupture.

In another experiment, in which the 2:1 mixture of salicylonitrile and acrylonitrile was subjected to substantially the same compression molding condition but in the absence of the zinc oxide, there was obtained no solid disc; instead only a brown, sticky material was formed.

What we claim is:

1. The process of preparing an organometallic polymer which comprises reacting together, at a temperature of from 125° C. to 500° C. and at a pressure of from 3,500 kg./cm.$^2$ to 40,000 kg./cm.$^2$, (I) a hydrocarbon nitrile selected from the class consisting of the nitriles of α,β-mono-olefinic, aliphatic hydrocarbon carboxylic acids having a total of from 3 to 6 carbon atoms, dinitriles of paraffinic hydrocarbon dicarboxylic acids having a total of from 4 to 8 carbon atoms, and the dinitriles of benzenedicarboxylic acids and alkylbenzene dicarboxylic acids having a total of from 6 to 11 carbon atoms, and (II), a metal compound of the formula

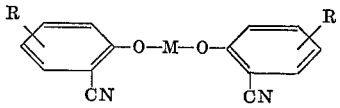

in which M is a metal selected from the class consisting of zinc, beryllium and cadmium and R is selected from the class consisting of hydrogen and alkyl radicals of from 1 to 5 carbon atoms.

2. The process defined in claim 1, further limited in that said metal compound is formed in situ, during the reaction, from zinc oxide and a hydroxy nitrile of the formula

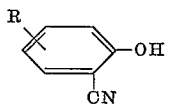

in which R is selected from the class consisting of hydrogen and alkyl radicals of from 1 to 5 carbon atoms.

3. Organometallic polymers prepared by the process of claim 1.

4. Organometallic polymers prepared by the process of claim 2.

5. The process of preparing an organometallic polymer which comprises reacting together at a temperature of from 125° C. to 500° C. and at a pressure of from 3,500 kg./cm.$^2$ to 40,000 kg./cm.$^2$, a nitrile of an $\alpha,\beta$-monoolefinic aliphatic hydrocarbon carboxylic acid having a total of from 3 to 6 carbon atoms and a metal compound of the formula

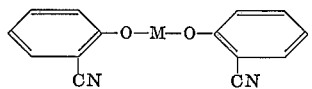

in which M is a metal selected from the class consisting of zinc, cadmium and beryllium.

6. Organometallic polymers prepared according to the process of claim 5.

7. The process of preparing an organometallic polymer which comprises reacting together, at a temperature of from 125° C. to 500° C. and at a pressure of from 3,500 kg./cm.$^2$ to 40,000 kg./cm.$^2$, a dinitrile of a paraffinic hydrocarbon dicarboxylic acid having a total of from 4 to 8 carbon atoms, and a metal compound of the formula

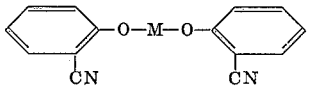

in which M is a metal selected from the class consisting of zinc, cadmium and beryllium.

8. Organometallic polymers prepared according to the process of claim 7.

9. The process of preparing an organometallic polymer which comprises reacting together, at a temperature of from 125° C. to 500° C. and at a pressure of from 3,500 kg./cm.$^2$ to 40,000 kg./cm.$^2$, a dinitrile of a benzenedicarboxylic acid and a metal compound of the formula

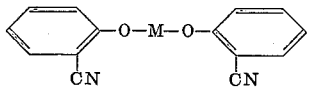

in which M is a metal selected from the class consisting of zinc, cadmium and beryllium.

10. Organometallic polymers prepared according to the process of claim 9.

11. The process of preparing an organometallic polymer which comprises condensing acrylonitrile with bis-(2-cyanophenoxy)zinc(II) at a temperature of from 125° C. to 500° C. and a pressure of from 3,500 kg./cm.$^2$ to 40,000 kg./cm.$^2$ to obtain an organometallic solid polymer.

12. The organometallic polymer prepared by the process of claim 11.

13. The process which comprises condensing terephthalonitrile with bis(2-cyanophenoxy)zinc(II) at a temperature of from 125° C. to 500° C. and a pressure of from 3,500 to 40,000 kg./cm.$^2$ to obtain an organometallic solid polymer.

14. The organometallic polymer prepared by the process of claim 13.

15. The process which comprises condensing adiponitrile with bis(2-cyanophenoxy)zinc(II) at a temperature of from 125° C. to 500° C. and a pressure of from 3,500 to 40,000 kg./cm.$^2$ to obtain an organometallic solid polymer.

16. The process which comprises condensing acrylonitrile with a mixture of zinc oxide and salicylonitrile at a temperature of from 125° C. to 500° C. and a pressure of from 3,500 to 40,000 kg./cm.$^2$ to obtain an organometallic solid polymer.

17. The organometallic polymer prepared by the process of claim 16.

18. The process which comprises condensing adiponitrile with a mixture of zinc oxide and salicylonitrile at a temperature of from 125° C. to 500° C. and a pressure of from 3,500 to 40,000 kg./cm.$^2$ to obtain an organometallic solid polymer.

19. The organometallic polymer prepared by the process of claim 18.

No references cited.

MURRAY TILLMAN, *Primary Examiner.*

HAROLD N. BURSTEIN, *Examiner.*